United States Patent
Oh et al.

(10) Patent No.: US 8,858,837 B2
(45) Date of Patent: *Oct. 14, 2014

(54) ELECTROLYTE COMPRISING EUTECTIC MIXTURE AND ELECTROCHEMICAL DEVICE USING THE SAME

(75) Inventors: Jae Seung Oh, Seoul (KR); Byoung Bae Lee, Daejeon (KR); Jae Duk Park, Daejeon (KR); Ji Won Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 940 days.

This patent is subject to a terminal disclaimer.

(21) Appl. No.: 11/506,216

(22) Filed: Aug. 18, 2006

(65) Prior Publication Data

US 2007/0042266 A1 Feb. 22, 2007

(30) Foreign Application Priority Data

Aug. 19, 2005 (KR) .......... 10-2005-0076149
Dec. 15, 2005 (KR) .......... 10-2005-0123942

(51) Int. Cl.

| H01B 1/00 | (2006.01) |
|---|---|
| H01M 6/04 | (2006.01) |
| H01M 10/0565 | (2010.01) |
| H01G 11/56 | (2013.01) |
| H01M 10/0567 | (2010.01) |
| H01M 10/42 | (2006.01) |
| H01G 11/58 | (2013.01) |
| C08K 5/00 | (2006.01) |
| H01G 9/022 | (2006.01) |
| C08L 33/02 | (2006.01) |
| H01M 10/0525 | (2010.01) |

(52) U.S. Cl.
CPC ......... *C08K 5/0008* (2013.01); *H01M 10/0565* (2013.01); *H01G 11/56* (2013.01); *H01M 10/0567* (2013.01); *H01M 10/4235* (2013.01); *Y02E 60/13* (2013.01); *H01G 11/58* (2013.01); *C08L 33/02* (2013.01); *H01M 10/0525* (2013.01); *Y02E 60/12* (2013.01); *H01G 9/038* (2013.01)
USPC .......................... 252/500; 429/189

(58) Field of Classification Search
USPC ................... 252/500; 429/188, 303, 189
See application file for complete search history.

(56) References Cited

U.S. PATENT DOCUMENTS

| 3,302,071 A * | 1/1967 | Stahr .......................... 361/504 |
|---|---|---|
| 4,104,451 A | 8/1978 | Klemann et al. |
| 4,344,674 A | 8/1982 | Giglia |
| 4,624,754 A * | 11/1986 | McManis et al. ............ 205/234 |
| 4,894,302 A | 1/1990 | Hoffman et al. |
| 5,441,827 A | 8/1995 | Gratzel et al. |
| 5,699,192 A | 12/1997 | Van Dine et al. |
| 5,827,602 A | 10/1998 | Koch et al. |
| 6,316,141 B1 | 11/2001 | Aurbach et al. |
| 6,667,825 B2 | 12/2003 | Lu et al. |
| 2002/0009649 A1 * | 1/2002 | Sato et al. ...................... 429/306 |
| 2002/0191270 A1 | 12/2002 | Lu et al. |
| 2003/0165738 A1 | 9/2003 | Bronoel et al. |
| 2004/0097755 A1 * | 5/2004 | Abbott et al. ................. 562/553 |

FOREIGN PATENT DOCUMENTS

| EP | 1365463 A2 | 11/2003 |
|---|---|---|
| JP | 10-265674 | 10/1998 |
| JP | 2002-099001 | 4/2002 |
| JP | 2002-99001 A | 4/2002 |
| JP | 2003-510791 | 3/2003 |
| RU | 2037862 | 6/1995 |
| RU | 2 117 971 | 8/1998 |
| RU | 2 277 272 | 5/2006 |
| SU | 1022669 | 6/1983 |
| WO | WO 93/21557 | 10/1993 |
| WO | WO 01/29919 | 4/2001 |
| WO | WO 02/26701 A2 | 4/2002 |

OTHER PUBLICATIONS

Berchiesi et al., Thermochimica Acte, 70,(1983) 317-324.*
Zhang et al., Electrochromism Material and Use Thereof, Electronic Components & Materials vol. 18, No. 1, pp. 32-36 (China Academic Journal Electronic Publishing House).
Berchiesi et al. "Supercooling Phenomena in Binary Mixtures of Acetamide and Inorganic Salts", Thermochimica Acta, 70, (1983) p. 317-324, Elsevier Science Publishers, Amsterdam. XP026552852.
"Eutectic System", Wikipedia, Aug. 17, 2010, XP002599082.
G. Berchiesi et al., "Super Phenomena in Binary Mixtures of Acetamide and Inorganic Salts", Thermochimica Acta, 1983, vol. 70, Issues 1-3, pp. 317-324.

* cited by examiner

*Primary Examiner* — Monique Peets
(74) *Attorney, Agent, or Firm* — McKenna, Long & Aldridge LLP

(57) ABSTRACT

Disclosed is an electrolyte comprising a eutectic mixture formed of: (a) an amide group-containing compound; and (b) a lithium-free ionizable salt. An electrochemical device comprising the electrolyte is also disclosed. The electrolyte improves the quality of and electrochemical device due to the excellent conductivity of the metal cation contained in the eutectic mixture, a broad electrochemical window and low viscosity. Additionally, since the eutectic mixture has excellent thermal and chemical stability, it is possible to solve the problems of evaporation, exhaustion and ignition of electrolytes, to minimize side reactions between constitutional elements of the device and the electrolyte, and to improve the safety of the electrochemical device.

20 Claims, 3 Drawing Sheets

ELECTROLYTE COMPRISING EUTECTIC MIXTURE AND ELECTROCHEMICAL DEVICE USING THE SAME

This application claims the benefit of the filing date of Korean Patent Application Nos. 10-2005-0076149, 10-2005-0123942, filed on Aug. 19, 2005 and Dec. 15, 2005 in the Korean Intellectual Property Office, the disclosure of which is incorporated herein in its entirely by reference.

TECHNICAL FIELD

The present invention relates to a eutectic mixture-containing electrolyte having high thermal and chemical stability, high electric conductivity and a broad electrochemical window. Also, the present invention relates to an electrochemical device having improved safety and quality by using the same electrolyte.

BACKGROUND ART

In general, various kinds of electrolytes have been used in electrochemical devices widely used in recent years, such as lithium secondary batteries, electrolytic condensers, electric double layer capacitors or electrochromic display devices, and dye-sensitized solar cells that have been studied intensively for their practical use in the future. Under these circumstances, importance of such electrolytes has increased more and more.

Electrolytes that have been used the most widely in recent years include non-aqueous solutions containing electrolyte salts dissolved in organic solvents such as ethylene carbonate, propylene carbonate, dimethoxyethane, gamma-butyrolactone (GBL), N,N-dimethyl formamide, tetrahydrofuran or acetonitrile. Such non-aqueous electrolytes have to serve as media performing conduction of ions and electrons between both electrodes, and should be stable in the drive voltage range of a device to which they are applied and show sufficiently high ion conductivity. However, the organic solvents used in such electrolytes have a low viscosity, leak out easily, and have high volatility to cause evaporation. Additionally, such organic solvents are ignitable, and thus are problematic in terms of long-term reliability, durability and stability. Therefore, recently, many studies have been conducted to utilize an ionic liquid as an electrolyte for an electrochemical device. However, conventional ionic liquids are expensive, and are obtained via a complicated preparation and purification process. Moreover, a liquid electrolyte is disadvantageous because it has possibility of leakage and it is not applicable to devices designed to have a large size or a small thickness.

Meanwhile, G. Berchiesi and coworkers have prepared a eutectic mixture by using acetamide, LiSCN (lithium thiocyanate), $CH_3COOLi$ (lithium acetate), or the like (*Thermochimica Acta*, 1983, 70, pp 317-324). However, there is no disclosure of the use of the above eutectic mixture as an electrolyte for an electrochemical device.

BRIEF DESCRIPTION OF THE DRAWINGS

The foregoing and other objects, features and advantages of the present invention will become more apparent from the following detailed description when taken in conjunction with the accompanying drawings in which.

DISCLOSURE OF THE INVENTION

Figure 1:
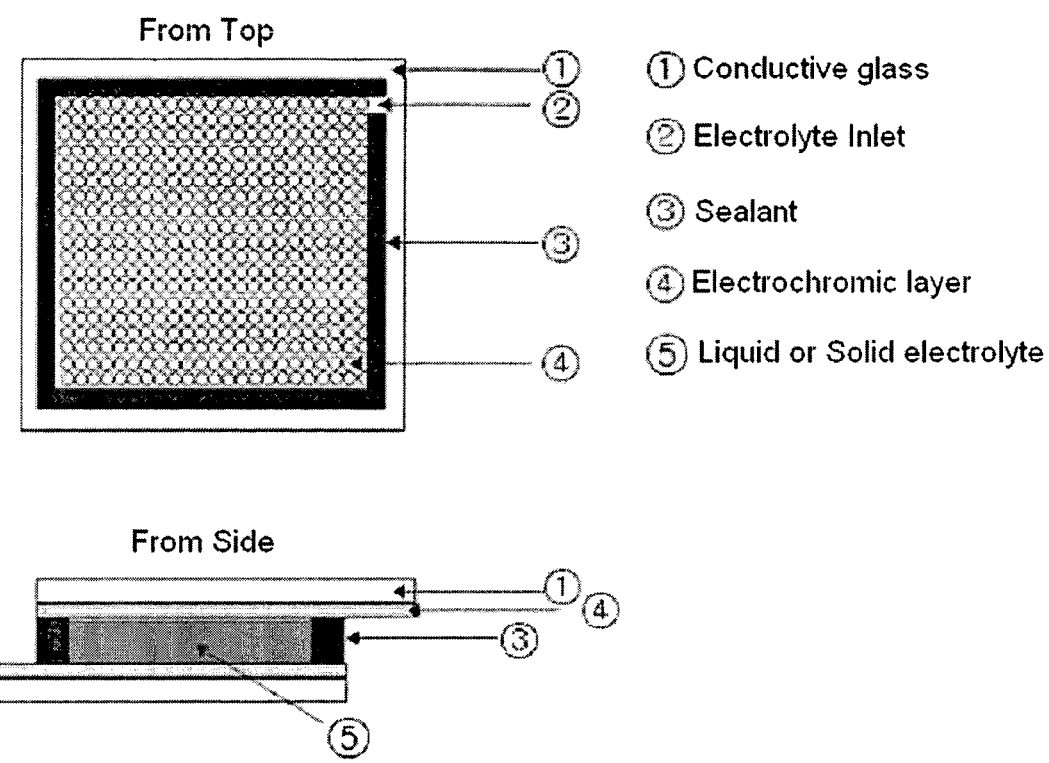
FIG. 1 is a schematic view showing a conventional electrochromic device.

Therefore, the present invention has been made in view of the above-mentioned problems. We have found that when a cost-efficient eutectic mixture having excellent thermal and chemical stability is used in an electrolyte for electrochemical devices, it is possible to solve the problems of evaporation, exhaustion and flammability of electrolytes caused when using a conventional organic solvent as electrolyte, thereby improving the safety. We have also found that it is possible to improve the quality of an electrochemical device by virtue of excellent conductivity and a broad electrochemical window of the eutectic mixture.

It is an object of the present invention to provide an electrolyte, which comprises a eutectic mixture, and an electrochemical device using the same electrolyte.

According to an aspect of the present invention, there is provided an electrolyte comprising a eutectic mixture formed of: (a) an amide group-containing compound; and (b) a lithium-free ionizable salt. There is also provided an electrochemical device, preferably an electrochromic device, comprising the above electrolyte.

Hereinafter, the present invention will be explained in more detail.

The present invention is characterized by using a eutectic mixture to form an electrolyte for an electrochemical device, wherein the eutectic mixture is free from lithium.

Generally, a eutectic mixture is referred to as a mixture containing two or more substances and having a decreased melting point. Particularly, such eutectic mixtures include mixed salts present in a liquid phase at room temperature. Herein, room temperature means a temperature of up to 100° C., or a temperature of up to 60° C. in some cases.

According to the present invention, the eutectic mixture comprises at least two materials, one of which includes any metal salt having higher conductivity when compared to a conventional lithium salt. Thus, it is possible to improve the quality of an electrochemical device by virtue of increased ion conductivity of an electrolyte caused by such excellent conductivity of the metal component. For example, when a sodium (Na)-containing salt is used as a metal salt, it is possible to obtain a conductivity improved by about at least three times even to ten times or more when compared to a lithium salt. Additionally, when an electrolyte contains such a metal salt, it shows a significantly decreased viscosity when compared to an electrolyte using a lithium salt, and thus ion movement and/or transfer via the electrolyte is facilitated, resulting in improvement of the quality of an electrochemical device. It is thought that such decreased viscosity results from weakening of binding force in the salt due to the metal larger than lithium. Further, the electrolyte according to the present invention utilizes an organic salt to form a eutectic mixture, while a conventional electrolyte utilizes a metal salt to form a eutectic mixture. Therefore, it is possible to overcome the limitation in composition of a eutectic mixture according to the present invention.

In addition, the electrolyte comprising the aforementioned eutectic mixture shows a broader electrochemical window when compared to conventional organic solvents and ionic liquids due to the physical stability of the eutectic mixture itself, so that an electrochemical device using the above electrolyte can have an extended range of drive voltage. In fact, conventional electrolytes using ionic liquids and organic solvents show an upper limit of electrochemical window of approximately 4~4.5V, while the eutectic mixture according to the present invention shows an upper limit of electrochemical window of 4.5~5.5V, which is significantly extended when compared to the conventional electrolytes based on ionic liquids and organic solvents.

Further, the eutectic mixture contained in the electrolyte according to the present invention has no vapor pressure contrary to conventional solvents, and thus shows no problem of evaporation and exhaustion of the electrolyte. Also, the eutectic mixture has flame resistance, thereby improving the safety of an electrochemical device. Moreover, the eutectic mixture itself is very stable, and thus can inhibit side reactions in the electrochemical device. In fact, a eutectic mixture has a broad temperature range where it exists as liquid, high solvation capability, non-coordinate character, or the like. Thus, it is known that a eutectic mixture has physicochemical properties as an eco-friendly solvent that can substitute for a conventional harmful organic solvent. Additionally, a eutectic mixture is prepared via a relatively simple process when compared to conventional ionic liquids and has a high ion concentration. Therefore, it is expected that such eutectic mixtures have a broad spectrum of applications.

According to a preferred embodiment of the present invention, one of the constitutional elements forming the eutectic mixture is an amide group-containing compound having two different polar functional groups, i.e. a carbonyl group and an amine group, in its molecule. However, any compound having at least two polar functional groups (e.g. an acidic group and a basic group) in the molecule may be used with no particular limitation.

The polar functional groups different from each other serve as complexing agents that weaken the bond between the cation and the anion of the ionizable salt, thereby forming a eutectic mixture, resulting in a drop in melting temperature. In addition to the above functional groups, compounds comprising polar functional groups that can weaken the bond between a cation and anion of an ionizable salt and thus capable of forming a eutectic mixture are also included in the scope of the present invention.

The amide group-containing compound may be an amide group-containing compound having a linear structure, a cyclic structure or a combination thereof. Non-limiting examples of the amine group-containing compound include C1~C10 alkyl amide, alkenyl amide, aryl amide or alkylaryl amide compounds. Also, Primary, secondary or tertiary amide compounds may be used. It is more preferable to use a cyclic amide compound showing a broader electrochemical window, because such cyclic amide compounds have a smaller number of hydrogen atoms and are stable under a high voltage so as to prevent decomposition thereof. Non-limiting examples of the amide compound that may be used in the present invention include acetamide, urea, methyl urea, caprolactam, valerlactam, carbamate, formamide and mixtures thereof.

The other constitutional element forming the eutectic mixture according to the present invention includes any lithium-free ionizable salt. Non-limiting examples of such salts include metal salts, organic salts or mixed salts thereof containing at least one metal selected from the group consisting of alkali metals except lithium, alkaline earth metals, transition metals, metalloids, lanthanides and actinides.

The eutectic mixture according to the present invention may be represented by the following Formula 1, but is not limited thereto:

[Formula 1]

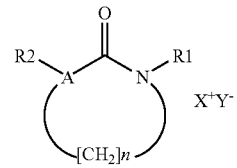

wherein $R_1$ is a hydrogen atom, a C1~C20 alkyl group, a C1~C20 alkylamine group, alkenyl group, aryl group or alkylaryl group;

$R_2$ is a hydrogen atom, a halogen atom, a C1~C20 alkyl group, alkenyl group, aryl group or alkylaryl group;

A is selected from the group consisting of carbon, oxygen, hydrogen, nitrogen and sulfur, with the proviso that when A is hydrogen, $R_2$ is null;

X represents at least one metal cation or organic cation selected from the group consisting of alkali metals except lithium, alkaline earth metals, transition metals, metalloids, lanthanides and actinides;

Y represents an anion capable of forming a salt with X; and n represents an integer of 0~10, and when n is 1 or more, A is selected from the group consisting of carbon, oxygen, nitrogen and sulfur, excluding hydrogen.

Preferably, in the compound represented by the above Formula 1, cation X represents secondary, tertiary and quaternary ammonium, phosphonium, magnesium, potassium or calcium, while anion Y is thiocyanate, formate, acetate, nitrate, perchlorate, sulfate, hydroxide, alkoxide, halogenide, carbonate, oxalate or tetrafluoroborate.

As described above, the constitutional elements of the eutectic mixture, i.e. the amide group-containing compound and the lithium-free ionizable salt (XY) cause the formation of a coordination bond between the carbonyl group present in the amide group-containing compound and the metal or organic cation ($X^+$) of the lithium-free ionizable salt, as well as the formation of a hydrogen bond between the anion ($Y^-$) of the salt and the amine group present in the amide group-containing compound, as shown in the following Reaction Scheme 1. In this manner, chemical bonds in each compound are weakened. As a result, the amide group-containing compound and the lithium-free ionizable salt, which was originally present in a sold state, show a decreased melting point, while they form a eutectic mixture present in a liquid state at room temperature.

[Reaction Scheme 1]

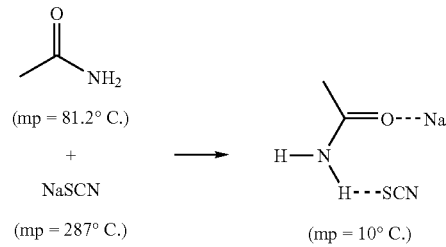

Although there is no particular limitation in melting point of the eutectic mixture according to the present invention, it is preferable that the eutectic mixture is in a liquid state at a temperature of up to 100° C., more preferably at room temperature. Also, although there is no particular limitation in viscosity of the eutectic mixture according to the present invention, the eutectic mixture preferably has a viscosity of 100 cp or less.

The eutectic mixture may be prepared by a conventional process known to one skilled in the art. For example, a compound having an amide group is mixed with an ionizable lithium-free salt at room temperature and then the mixture was reacted by heating it at a suitable temperature of 70° C. or less, followed by purification. Herein, the molar ratio (%) of the compound having an acidic functional group and basic functional group to lithium salt suitably ranges from 1:1 to 8:1, more preferably from 2:1 to 6:1.

<Electrolyte Comprising Eutectic Mixture>

The eutectic mixture according to the present invention may be applied to any electrolytes regardless of the forms of electrolytes. Preferably, the eutectic mixture may be applied to two types of electrolytes, i.e. liquid electrolytes and gel polymer electrolytes.

Herein, the electrolyte may further comprise at least one salt, preferably an ionizable lithium salt. Non-limiting examples of the anion of lithium salt that may be used in the present invention include $F^-$, $Cl^-$, $Br^-$, $I^-$, $NO_3^-$, $BF_4^-$, $PF_6^-$, $N(CN)_2^-$, $SCN^-$, $ClO_4^-$, $(CF_3)_3PF_3^-$, $(CF_3)_4PF_2^-$, $(CF_3)_5PF^-$, $(CF_3)_6P^-$, $(CF_3CF_2SO_2^-)_2N$, $(CF_3SO_2)_2N^-$, $CF_3SO_3^-$, $CF_3CF_2(CF_3)_2CO^-$, $(CF_3SO_2)_2CH^-$, $(CF_3SO_2)_3C^-$, $CF_3(CF_2)_7SO_3^-$, $CF_3CO_2^-$, $CH_3CO_2^-$, or the like. If possible, the anion is preferably the same as the anion forming the eutectic mixture. This is because when the anion contained in the lithium salt is different from the anion of the eutectic mixture, solubility of the lithium salt to the eutectic mixture-containing electrolyte may be degraded. The lithium salt is used preferably in a concentration of 0~1 mole/L, but is not limited thereto.

(1) According to an embodiment of the present invention, the electrolyte is a liquid type eutectic mixture-containing electrolyte, which may be obtained by using the eutectic mixture formed of the above amide group-containing compound and the lithium-free ionizable salt alone, or in combination with at least one salt.

(2) According to another embodiment of the present invention, the electrolyte is a gel polymer type eutectic mixture-containing electrolyte. The gel polymer serves to support the eutectic mixture. Thus, in this case, it is possible to solve the problem of electrolyte leakage, and to form an electrochemical device in the form of a thin film or other films.

The gel polymer electrolyte may be prepared by using a method generally known to those skilled in the art. The method may be performed according to the following three types of embodiments. It is matter of course that the eutectic mixture may further comprises at least one salt as described above.

① According to a preferred embodiment of the method, polymerization of monomers is performed in the presence of the eutectic mixture to form a gel polymer electrolyte. The method of forming a gel polymer electrolyte via polymerization of monomers may be performed by in-situ polymerization inside an electrochemical device. Otherwise, a gel polymer electrolyte may be introduced into an electrochemical device, after the gel polymer electrolyte is formed.

The gel polymer electrolyte can be formed by polymerizing an electrolyte pre-gel solution (electrolyte precursor solution) containing: (i) a eutectic mixture comprising an amide group-containing compound and a lithium-free ionizable salt; and (ii) monomers capable of forming a gel polymer via polymerization.

There is no limitation in the kind of monomer as long as it is capable of forming a gel polymer by polymerization and particular examples of such monomers include vinyl monomers, etc. Vinyl monomers have advantages in that they can provide transparent polymerization products when mixed with a eutectic mixture and they are amenable to simple polymerization conditions.

Non-limiting examples of the vinyl monomer that may be used according to the present invention include acrylonitrile, methyl methacrylate, methyl acrylate, methacrylonitrile, methyl styrene, vinyl esters, vinyl chloride, vinylidene chloride, acrylamide, tetrafluoroethylene, vinyl acetate, methyl vinyl ketone, ethylene, styrene, para-methoxystyrene, para-cyanostyrene, etc.

Preferably, the monomer capable of forming a gel polymer by polymerization provides low volumetric shrinkage upon polymerization and permits in-situ polymerization inside of an electrochemical device.

The polymerization of the monomers is generally performed under heat or UV irradiation, and thus the electrolyte pre-gel solution may further comprise a polymerization initiator or a photoinitiator.

Initiators are decomposed by heat or UV rays to form radicals, and then react with a monomer through free radical polymerization to form a gel polymer electrolyte. It is also possible to carry out polymerization of monomers without using any initiator. Generally, free radical polymerization includes an initiation step in which transient molecules or active points having strong reactivity are formed; a propagation step in which a monomer is added to the end of an active chain to form another active point at the end of the chain; a chain transfer step in which active points are transferred to other molecules; and a termination step in which the center of an active chain is broken.

Thermal initiators that may be used in the polymerization include organic peroxides or hydroperoxides such as benzoyl peroxide, acetyl peroxide, dilauryl peroxide, di-tert-butyl peroxide, cumyl hydroperoxide, hydrogen peroxide, etc., and azo compounds such as 2,2-azobis(2-cyanobutane), 2,2-azobis(methylbutyronitrile), AIBN(azobis(iso-butyronitrile), AMVN (azobisdimethyl-valeronitrile), organometallic compounds such as alkylated silver compounds, etc. Additionally, non-limiting examples of the photoinitiator that permits formation of radicals by the light such as UV rays include chloroacetophenone, diethoxy acetophenone(DEAP), 1-phenyl-2-hydroxy-2-methyl propaneone(HMPP), 1-hydroxycyclrohexyl phenyl ketone, α-aminoacetophenone, benzoin ether, benzyl dimethyl ketal, benzophenone, thioxanthone, 2-ethylanthraquinone(2-ETAQ), etc.

Additionally, the mixing ratio in the electrolyte precursor solution according to the present invention on the weight basis, i.e., the weight ratio of (eutectic mixture) x:(monomer capable of forming a gel polymer by polymerization) y:(polymerization initiator) z, is 0.5~0.95:0.05~0.5:0.00~0.05, with the proviso that x+y+z=1. More preferably, x is 0.7~0.95, y is 0.05~0.3 and z is 0.00~0.01.

In addition to the above-described materials, the precursor solution of gel polymer electrolyte according to the present invention optionally further comprises other additives known to one skilled in the art.

As described above, the in-situ polymerization is initiated by irradiation of heat or UV rays so as to form a gel polymer electrolyte. Herein, polymerization degree of the gel polymer depends on reaction conditions, i.e. polymerization time and temperature in the case of heat polymerization, or light irradiation dose in the case of UV polymerization. Therefore, it is possible to control the polymerization degree of a gel polymer as desired by controlling the reaction conditions including polymerization time, polymerization temperature or light irradiation dose. Additionally, polymerization time depends on the kind of the initiator used for the polymerization and polymerization temperature. It is preferable that polymerization is performed for a period of time during which leakage of the gel polymer electrolyte cannot occur and the electrolyte cannot be over-polymerized to such a degree that it causes volumetric shrinkage. For example, polymerization is generally performed for about 20~60 minutes at a temperature of about 40~80° C.

② According to another preferred embodiment of the present invention, the eutectic mixture is injected to a preformed polymer or gel polymer so that the polymer or gel polymer is impregnated with the eutectic mixture.

Non-limiting examples of the polymer that may be used in the present invention include polymethyl methacrylate, polyvinylidene difluoride, polyvinyl chloride, polyethylene oxide, polyhydroxyethyl methacrylate, etc. Any gel polymers known to one skilled in the art may also be used. In this case, it is possible to simplify processing steps compared to the above in-situ polymerization method.

③ According to still another preferred embodiment of the present invention, a polymer and the eutectic mixture are dissolved in a solvent and then the solvent is removed to form a gel polymer electrolyte. Herein, the eutectic mixture is included in the polymer matrix.

Although there is no particular limitation in selecting the solvent, non-limiting examples of the solvent include toluene, acetone, acetonitrile, THF, etc. Additionally, there is no particular limitation in the method for removing the solvent and any conventional heating methods may be used. However, the third method has a disadvantage in that there is a need of a post-treatment step for removing a solvent in order to form the gel polymer electrolyte.

<Electrochemical Device Using Electrolyte Comprising Eutectic Mixture>

The eutectic mixture-containing electrolyte according to the present invention may be applied to general electrochemical devices known to those skilled in the art, such electrochemical devices requiring various electrochemical properties depending on the particular use. Also, the eutectic mixture-containing electrolyte may be applied as an antistatic coating agent, a solvent for various types of chemical reactions, an extraction solvent, an electroplating solution, an additive, or the like.

Herein, the electrochemical devices include all types of devices in which electrochemical reactions are performed. Particular examples of the electrochemical devices include all kinds of primary and secondary batteries, fuel cells, solar cells, electrochromic devices or capacitors. More particularly, the electrochemical devices include lithium secondary batteries such as lithium metal secondary batteries, lithium ion secondary batteries, lithium polymer secondary batteries or lithium ion polymer batteries, electric double layer capacitors, dye-sensitized solar cells, electrochromic devices, or the like.

The electrochemical device may be manufactured by using a method generally known to those skilled in the art. According to one embodiment of the method, both electrodes (a cathode and an anode) are stacked to form an electrode assembly, and then an electrolyte is injected thereto. The electrochemical device may further comprise an additional constitutional element such as a separator, if necessary.

The present invention also provides such an electrochemical device, preferably an electrochromic device using the electrolyte comprising the eutectic mixture.

The electrochromic device comprises a first electrode, a second electrode and the electrolyte as described herein, disposed on a transparent or translucent substrate, wherein the first electrode, the second electrolyte, the electrolyte or a combination thereof may comprise an electrochromic material.

Non-limiting examples of the electrochromic material that may be used in the present invention include inorganic metal oxides such as $WO_3$, $Ir(OH)_x$, $MoO_3$, $V_2O_5$, $TiO_2$, $NiO_x$, $LiNiO_x$, $Li_2NiO_x$, etc.; conductive polymers such as polypyrrole, polyaniline, polyazulene, polypyridine, polyindole, polycarbazole, polyazine, polythiophene, etc.; organic electrochromic materials such as viologen, anthraquinone, phenocyazine, etc; and mixtures thereof.

More particularly, either or both of the first electrode and second electrode may be formed of a transparent conductive film. Non-limiting examples of the transparent conductive film include a thin metal film such as Ag or Cr, tin oxide, zinc oxide, metal oxides doped with a trace element, such as ITO (indium tin oxide), FTO (fluorine doped tin oxide) or IZO (indium zinc oxide), or a mixture thereof. Although there is no particular limitation in methods for forming the transparent electrode film, conventional methods known to those skilled in the art, including a vacuum vapor deposition method, an ion plating method, an electron beam vacuum deposition method and a sputtering method, may be used.

The electrochromic device may be manufactured according to a conventional method known to one skilled in the art. In one embodiment, the method includes the steps of: laminating the first electrode and second electrode by means of an adhesive, injecting the above-described electrolyte into the gap between the first electrode and the second electrode through an inlet and sealing the inlet.

There is no particular limitation in the form of the electrolyte injected to the electrochromic device, and electrolytes according to the above two embodiments may be used. Particularly, it is preferable to form a eutectic mixture-containing gel polymer electrolyte via in-situ polymerization between both electrodes of the electrochromic device. This is because injection of an electrolyte containing the eutectic mixture between both electrodes is easier than injection or stacking of the gel polymer electrolyte impregnated with the eutectic mixture, and excellent wetting and contact characteristics can be obtained between the eutectic mixture-containing gel polymer electrolyte and an electrode. Additionally, because the gel polymer electrolyte is formed via the in-situ polymerization of a mixture containing the eutectic mixture and monomers in a predetermined ratio at an adequate temperature, the process for manufacturing the electrochromic process is simple.

The electrochromic device can be applied to various applications requiring various electrochemical properties. Such applications include, but not exclusively, car mirrors, smart windows, sunroofs, display devices, or the like.

BEST MODE FOR CARRYING OUT THE INVENTION

Reference will now be made in detail to the preferred embodiments of the present invention. It is to be understood that the following examples are illustrative only and the present invention is not limited thereto.

PREPARATION EXAMPLE 1

Manufacture of Electrochromic Device Using Inorganic Metal Oxide-based Electrochromic Material in the Absence of Electrolyte A working electrode was manufactured by forming a thin film of $WO_3$ on ITO (indium tin oxide) glass (Samsung Corning Co.) as transparent electrode through a sputtering process to a thickness of 150 nm. A counter electrode provided with a thin film of NiO having a thickness of 150 nm was also manufactured in the same manner as described above. The working electrode and the counter electrode were sealed together along their edges except a portion by using a sealant containing a glass ball spacer, as shown in FIG. 1, to provide an electrochromic device free from electrolyte.

PREPARATION EXAMPLE 2

Manufacture of Electrochromic Device Using Conductive Polymer-based Electrochromic Material in the Absence of Electrolyte A working electrode was manufactured by coating PEDOT (poly-3,4-ethylenedioxythiophene) as electrode material on ITO glass as transparent electrode through an electropolymerization process to a thickness of about 150 nm. A counter electrode provided with a coating layer of PAN (polyaniline) as electrode material having a thickness of about 150 nm was also manufactured in the same manner as described above. The working electrode and the counter electrode were treated in the same manner as the above Preparation Example 1 to provide an electrochromic device free from electrolyte.

PREPARATION EXAMPLE 3

Manufacture of Electrochromic Device Using Inorganic Metal Oxide-based Electrochromic Material in the Absence of Electrolyte A working electrode was manufactured by forming a thin film of $WO_3$ on FTO (fluorine doped tin oxide) glass (Libby-Owens-Ford Glass Co.) as transparent electrode through a vapor deposition process to a thickness of 200 nm. A counter electrode provided with a thin film of $LiNiO_x$ having a thickness of 230 nm was also manufactured in the same manner as described above. The working electrode and the counter electrode were treated in the same manner as the above Preparation Example 1 to provide an electrochromic device free from electrolyte.

EXAMPLES 1-9

EXAMPLE 1

1-1. Preparation of Acetamide-NaSCN Eutectic Mixture 4.4 g of purified acetamide and 2 g of NaSCN (Sodium thiocyanate) were introduced into a round-bottom flask and stirred gradually at room temperature under nitrogen atmosphere for 12 hours to provide 11 g of the eutectic mixture of acetamide with LiTFSI.

1-2. Electrochromic Device Comprising Acetamide-NaSCN Eutectic Mixture as Liquid Electrolyte (1)

First, 0.1M $LiBF_4$ was dissolved in the acetamide-NaSCN eutectic mixture obtained from Example 1-1. Then, the resultant solution was injected into the electrochromic device having an inorganic metal oxide $WO_3/NiO_x$ electrode obtained from Preparation Example 1. The electrochromic device developed a blue color and showed a light transmission of 35% upon development, while it showed a light transmission of 72% upon quenching.

1-3. Electrochromic Device Comprising Acetamide-NaSCN Eutectic Mixture as Liquid Electrolyte (2)

The acetamide-NaSCN eutectic mixture obtained from Example 1-1 was injected into the electrochromic device obtained from Preparation Example 3. The electrochromic device developed a black color and showed a light transmission of 34% upon development, while it showed a light transmission of 74% upon quenching.

1-4. Electrochromic Device Comprising Acetamide-NaSCN Eutectic Mixture as Gel Electrolyte (1)

First, the acetamide-NaSCN eutectic mixture obtained from Example 1-1, 0.1M $LiBF_4$, HEMA (2-hydroxyethyl methacrylate) monomer, AMVN (azobisdimethyl valeronitrile) as a heat polymerization initiator were mixed in a weight ratio of 8:2:0.01. Next, the resultant mixture was injected into the electrochromic device according to Preparation Example 1. Then, the electrolyte inlet was sealed with a UV sealant, and polymerization was performed at 55° C. for 1 hour to form a gel polymer electrolyte. The electrochromic device developed a dark blue color and showed a light transmission of 32% upon development, while it showed a light transmission of 71% upon quenching.

1-5. Electrochromic Device Comprising Acetamide-NaSCN Eutectic Mixture as Gel Electrolyte (2)

A gel polymer electrolyte was formed in the same manner as described in Example 1-4, except that the acetamide-NaSCN eutectic mixture obtained from Example 1-1 was injected into the electrochromic device according to Preparation Example 3. The electrochromic device developed a black color and showed a light transmission of 32% upon development, while it showed a light transmission of 74% upon quenching.

1-6. Electrochromic Device Comprising Acetamide-NaSCN Eutectic Mixture as Gel Electrolyte (3)

An electrochromic device using a eutectic mixture-containing gel polymer as an electrolyte was provided in the same manner as described in Example 1-3, except that the electrochromic device according to Preparation Example 2 was used instead of the electrochromic device according to Preparation Example 1. The electrochromic device developed a dark blue color and showed a light transmission of 33% upon development, while it showed a light transmission of 73% upon quenching.

1-7. Electrochromic Device Otained by UV Polymerization Using Acetamide-NaSCN Eutectic Mixture (4)

First, the acetamide-NaSCN eutectic mixture obtained from Example 1-1, 0.1M $LiBF_4$, TAEI (tris[2-(acryloyloxy)ethyl]isocyanurate) as a crosslinking agent, MPEGM (methoxy poly(ethylene glycol)methacrylate) as a monomer, and Irgacure-184 (Ciba) as a UV polymerization initiator were mixed in a weight ratio of 50:0.5:50:10 to provide an electrolyte precursor. Next, the resultant precursor was injected into the electrochromic device having an inorganic metal oxide $WO_3/NiO_x$ electrode according to Preparation Example 1. Then, the electrolyte inlet was sealed with a UV sealant, and polymerization was performed for 30 minutes under the irradiation of UV rays to form a gel polymer electrolyte. The electrochromic device using the transparent gel polymer electrolyte developed a dark blue color and showed a light transmission of 32% upon development, while it showed a light transmission of 75% upon quenching.

1-8. Electrochromic Device Comprising Acetamide-NaSCN Eutectic Mixture as Gel Electrolyte (5)

An electrochromic device using a eutectic mixture-containing gel polymer as an electrolyte was provided in the same manner as described in Example 1-7, except that the electrochromic device according to Preparation Example 3 was used instead of the electrochromic device according to Preparation Example 1. The electrochromic device developed a black color and showed a light transmission of 29% upon development, while it showed a light transmission of 75% upon quenching.

EXAMPLE 2

Preparation of Methylurea-NaSCN Eutectic Mixture

To a round-bottom flask, 4.5 g of purified methylurea and 2 g of NaSCN (sodium thiocyanate) were introduced. The mixture was agitated gradually under nitrogen atmosphere at 70° C. for 10 hours to obtain 6.5 g of methylurea-NaSCN eutectic mixture.

EXAMPLE 3

Preparation of Acetamide-urea-NaSCN Eutectic Mixture

To a round-bottom flask, 3.3 g of purified acetamide, 3.3 g of purified urea and 2 g of NaSCN (sodium thiocyanate) were introduced. The mixture was agitated gradually under nitrogen atmosphere at 30° C. for 5 hours to obtain 8.6 g of acetamide-urea-NaSCN eutectic mixture.

EXAMPLE 4

4-1. Preparation of Methyl Carbamate-NaSCN Eutectic Mixture

To a round-bottom flask, 13.7 g of purified methyl carbamate and 5 g of NaSCN (sodium thiocyanate) were introduced. The mixture was agitated gradually under nitrogen atmosphere at 50° C. for 50 minutes to obtain 18.7 g of methyl carbamate-NaSCN eutectic mixture.

4-2. Electrochromic Device Comprising Methylcarbamate-NaSCN Eutectic Mixture as Liquid Electrolyte An electrochromic device was manufactured in the same manner as described in Example 1-2, except that the methyl carbamate-NaSCN eutectic mixture was used instead of acetamide-NaSCN eutectic mixture. The electrochromic device developed a blue color and showed a light transmission of 30% upon development, while it showed a light transmission of 72% upon quenching.

4-3. Electrochromic Device Comprising Methylcarbamate-NaSCN Eutectic Mixture as Gel Electrolyte An electrochromic device was manufactured in the same manner as described in Example 1-4, except that the methyl carbamate-NaSCN eutectic mixture was used instead of acetamide-NaSCN eutectic mixture. The electrochromic device developed a blue color and showed a light transmission of 34% upon development, while it showed a light transmission of 75% upon quenching.

EXAMPLE 5

Preparation of N-benzylformamide-NaSCN Eutectic Mixture

To a round-bottom flask, 9.9 g of purified N-benzyl formamide and 4 g of NaSCN (sodium thiocyanate) were introduced. The mixture was agitated gradually under nitrogen atmosphere at 30° C. for 40 minutes, and then at room temperature for 5 hours to obtain 10.7 g of N-benzyl formamide-NaSCN eutectic mixture.

EXAMPLE 6

Preparation of Acetamide-$NH_4SCN$ Eutectic Mixture

To a round-bottom flask, 6.9 g of purified acetamide (trifluoroacetamide) and 3 g of $NH_4SCN$ (ammonium thiocyanate) were introduced. The mixture was agitated gradually under nitrogen atmosphere at 40° C. for 50 minutes to obtain 9.9 g of acetamide-$NH_4SCN$ eutectic mixture.

EXAMPLE 7

Preparation of Caprolactam-$NH_4SCN$ Eutectic Mixture

To a round-bottom flask, 8.92 g of purified caprolactam and 2 g of $NH_4SCN$ (ammonium thiocyanate) were introduced. The mixture was agitated gradually under nitrogen atmosphere at 50° C. for 4 hours and cooled to room temperature to obtain 10.9 g of caprolactam-$NH_4SCN$ eutectic mixture.

EXAMPLE 8

Preparation of Acetamide-urea-$NH_4SCN$ Eutectic Mixture

To a round-bottom flask, 3.6 g of purified acetamide, 3.6 g of urea and 3 g of $NH_4SCN$ (ammonium thiocyanate) were introduced. The mixture was agitated gradually under nitrogen atmosphere at 30° C. for 10 hours to obtain 10 g of acetamide-urea-$NH_4SCN$ eutectic mixture.

EXAMPLE 9

Preparation of Acetamide-urea-$NH_4NO_3$ Eutectic Mixture

To a round-bottom flask, 3 g of purified acetamide, 3 g of urea and 1.6 g of $NH_4NO_3$ were introduced. The mixture was agitated gradually under nitrogen atmosphere at 50° C. for 4 hours and cooled to room temperature to obtain 7.6 g of acetamide-urea-$NH_4NO_3$ eutectic mixture.

COMPARATIVE EXAMPLES 1 AND 2

COMPARATIVE EXAMPLE 1

Electrochromic Device Comprising Liquid Electrolyte

An electrochromic device was manufactured in the same manner as described in Example 1-2, except that γ butyrolactone containing 1M $LiClO_4$ was used as a liquid electrolyte. The finished electrochromic device developed a dark blue color and showed a light transmission of 34% upon development, while it showed a light transmission of 76% upon quenching. However, the electrolyte evaporated and dried up easily due to the use of the organic solvent. Also, side reactions including decomposition of organic compounds occurred after repeating development-quenching cycles.

COMPARATIVE EXAMPLE 2

Preparation of Caprolactam-LiTFSI Eutectic Mixture

To a round bottom flask, 9.6 g of purified caprolacatam and 8.16 g of LiTFSI were introduced. The mixture was agitated gradually under nitrogen atmosphere at 50° C. for 4 hours and cooled to room temperature to obtain 17 g of methyl caprolactam-LiTFSI eutectic mixture.

EXPERIMENTAL EXAMPLE 1

Evaluation of Physical Properties for Eutectic Mixture

The following test was performed to evaluate physical properties of the eutectic mixture according to the present invention. The eutectic mixtures according to Examples 1~9 were used as samples and the eutectic mixture according to Comparative Example 2 was used as a control. In each eutectic mixture, amide compound and salt were used in a ratio of 3:1. The melting point of each eutectic mixture was measured by DSC (differential scanning calorimeter), and the decomposition temperature of each eutectic mixture was measured by TGA (termogravimetric analysis). Also, the viscosity of each eutectic mixture was measured by using a RS150 viscosimeter at 25° C. The results are shown in the following Table 1.

TABLE 1

| | Compound having acidic group and basic group | salt | m.p. (° C.) | Decomposition temperature (° C.) | Viscosity (cP) | Conductivity (mS/cm) |
|---|---|---|---|---|---|---|
| Ex. 1 | Acetamide | NaSCN | 10 | 100 | 152 | 2.45 |
| Ex. 2 | Methylurea | NaSCN | 10 | 140 | 265 | 0.85 |
| Ex. 3 | Acetamide + Urea | NaSCN | 10 | 100 | 132 | 2.90 |
| Ex. 4 | Methyl carbamate | NaSCN | 5 | 60 | 48 | 1.4 |
| Ex. 5 | N-benzyl formamide | NaSCN | −46.56 | 145 | 155 | 0.34 |
| Ex. 6 | Acetamide | $NH_4SCN$ | 5 | 100 | 16 | 17.2 |
| Ex. 7 | Caprolactam | $NH_4SCN$ | 0 | 130 | 620 | 0.26 |
| Ex. 8 | Acetamide + Urea | $NH_4SCN$ | 10 | 100 | 22 | 15.1 |
| Ex. 9 | Acetamide + Urea | $NH_4NO_3$ | 20 | 110 | 50 | 0.02 |
| Comp. Ex. 2 | Caprolactam | LiTFSI | −38 | 120 | 3100 | 0.03 |

EXPERIMENTAL EXAMPLE 2

Evaluation for Quality of Electrochromic Device

Each electrochromic device using the lithium-free eutectic mixture according to the present invention, a lithium-containing eutectic mixture as electrolyte was evaluated for quality as follows.

The electrochromic device comprising the acetamide-NaSCN eutectic mixture-containing electrolyte according to Example 1 was used. The electrochromic device comprising the caprolactam-LiTFSI eutectic mixture-containing electrolyte according to Comparative Example 2 was used as controls.

Figure 2:
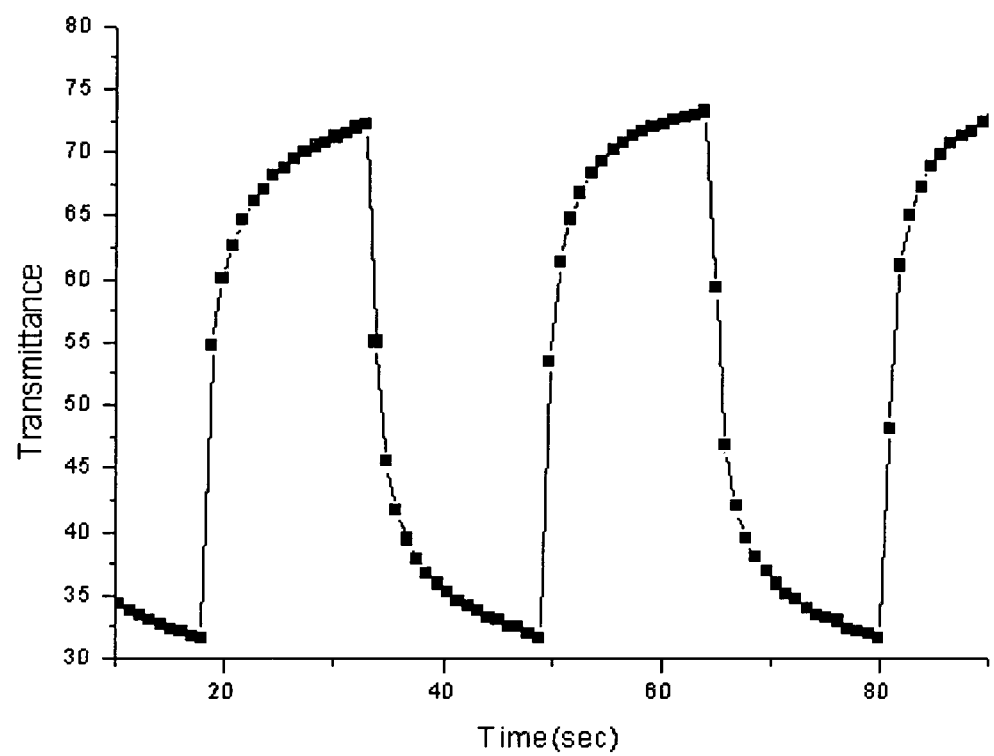
FIG. 2 is a graph showing variations in transmittance with time for an electrochromic device using the electrolyte comprising acetamide-NaSCN(Sodium Thiocyanate) eutectic mixture (molar ratio 3:1) according to Example 1.
Figure 3:
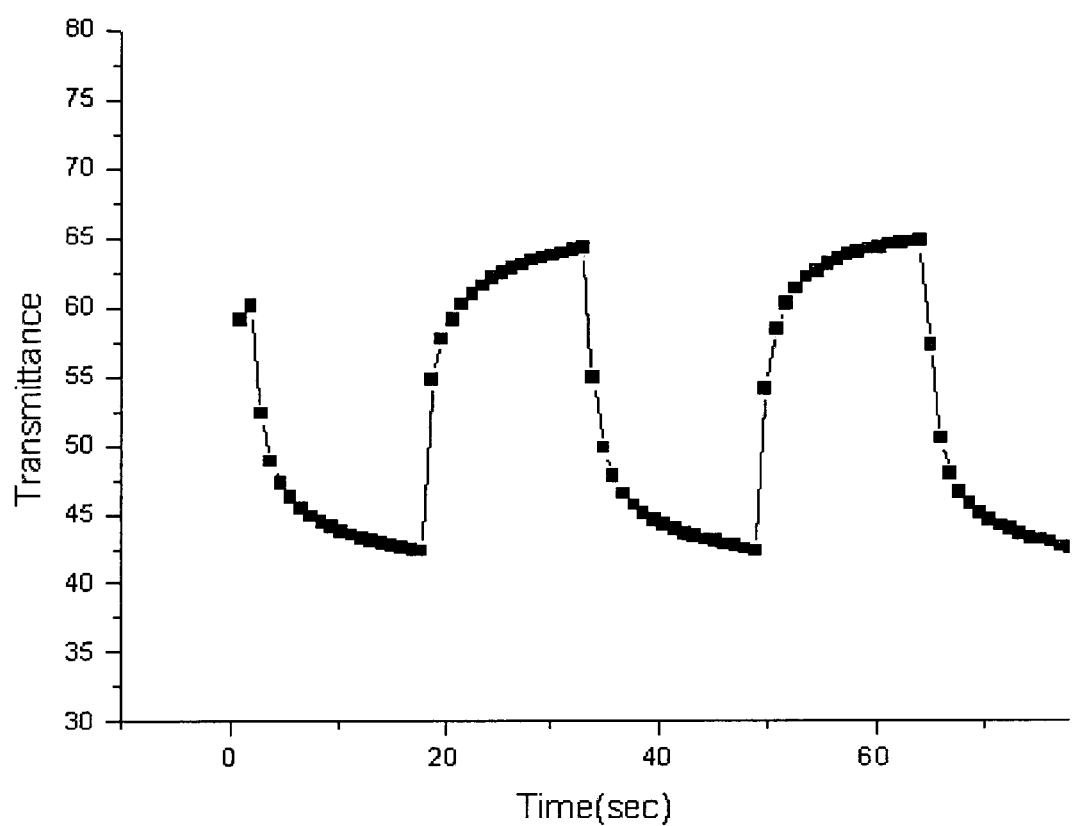
FIG. 3 is a graph showing variations in transmittance with time for an electrochromic device using the electrolyte comprising caprolactam-LiTFSI (Lithium Trifluoromethane sulfonimide) eutectic mixture (molar ratio 3:1) according to Comparative Example 2.

After measuring color developing/quenching rate and coloring/bleaching range of each electrochromic device, the electrochromic device using lithium-containing eutectic mixture electrolyte according to Comparative Example 2 showed a narrow transmittance when the electrochromic device was subjected to developing/quenching(discolor range: 42~65) (see, FIG. 3). On the contrary, the electrochromic device using the lithium-free eutectic mixture obtained from Example 1 as electrolyte showed a significantly wider coloring/bleaching range compared to that of the electrochromic device using the lithium-containing eutectic mixture as electrolyte according to Comparative Example 2(see, FIG. 2), and an excellent color developing/quenching rate.

Industrial Applicability

As can be seen from the foregoing, the electrolyte for an electrochemical device according to the present invention comprises a eutectic mixture, which is cost-efficient and has excellent thermal and chemical stability. Therefore, it is possible to solve the problems of evaporation, exhaustion and ignition of electrolytes, to minimize side reactions between constitutional elements of the device and the electrolyte, and to improve the safety of the electrochemical device. Additionally, due to the excellent conductivity of the metal cation contained in the eutectic mixture and a broad electrochemical window, the electrolyte according to the present invention may be applied to electrochemical devices requiring various electrochemical properties.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. An electrolyte comprising a eutectic mixture formed of an amide group-containing compound and a lithium-free ionizable salt,
    wherein a molar ratio of the amide group-containing compound to the lithium-free ionizable salt ranges from 1-8:1, and
    wherein the eutectic mixture is one selected from the group consisting of a mixture of methylurea and NaSCN, a mixture of acetamide, urea and NaSCN, a mixture of methylcarbamate and NaSCN, and a mixture of N-benzylformamide and NaSCN.

2. The electrolyte according to claim 1, which further comprises a lithium salt.

3. The electrolyte according to claim 2, wherein the lithium salt comprises one anion selected from the group consisting of $F^-$, $Cl^-$, $Br^-$, $I^-$, $NO_3^-$, $BF_4^-$, $PF_6^-$, $N(CN)_2^-$, $SCN^-$, $ClO_4^-$, $(CF_3)_3PF_3^-$, $(CF_3)_4PF_2^-$, $(CF_3)_5PF^-$, $(CF_3)_6P^-$, $(CF_3CF_2SO_2^-)_2N$, $(CF_3SO_2)_2N^-$, $CF_3SO_3^-$, $CF_3CF_2(CF_3)_2CO^-$, $(CF_3SO_2)_2CH^-$, $(CF_3SO_2)_3C^-$, $CF_3(CF_2)_7SO_3^-$, $CF_3CO_2^-$ and $CH_3CO_2^-$.

4. The electrolyte according to claim 2, is a liquid electrolyte comprising the eutectic mixture in combination with the lithium salt.

5. The electrolyte according to claim 2, is a gel polymer electrolyte formed by polymerization of any one electrolyte pre-gel solution selected from the group consisting of:
   (i) an electrolyte pre-gel solution comprising the eutectic mixture and monomers capable of forming a gel polymer via polymerization; and
   (ii) an electrolyte pre-gel solution comprising the eutectic mixture, monomers capable of forming a gel polymer via polymerization and the lithium salt.

6. The electrolyte according to claim 5, wherein the monomers are a vinyl monomer.

7. The electrolyte according to claim 6, wherein the vinyl monomer is one monomer selected from the group consisting of acrylonitrile, methyl methacrylate, methyl acrylate, methacrylonitrile, methyl styrene, vinyl esters, vinyl chloride, vinylidene chloride, acrylamide, tetrafluoroethylene, vinyl acetate, methyl vinyl ketone, ethylene, styrene, para-methoxystyrene and para-cyanostyrene.

8. The electrolyte according to claim 5, wherein the electrolyte pre-gel solution further comprises a polymerization initiator or a photoinitiator.

9. The electrolyte according to claim 5, wherein the electrolyte pre-gel solution comprises the eutectic mixture (x), the monomers capable of forming the gel polymer via polymerization (y) and the polymerization initiator (z) in a weight ratio of x:y:z, wherein x is 0.5~0.95, y is 0.05~0.5 and z is 0.00~0.05, with the proviso that x+y+z=1.

10. The electrolyte according to claim 5, which is obtained by in-situ polymerization inside an electrochemical device.

11. The electrolyte according to claim 1, which comprises a polymer or gel polymer impregnated with the eutectic mixture.

12. The electrolyte according to claim 11, wherein the polymer is selected from the group consisting of polymethyl methacrylate, polyvinylidene difluoride, polyvinyl chloride, polyethylene oxide and polyhydroxyethyl methacrylate.

13. An electrochemical device comprising the electrolyte as defined in claim 1, wherein the electrolyte consists of a eutectic mixture formed of an amide group-containing compound and a lithium-free ionizable salt, and a molar ratio of the amide group-containing compound to the lithium-free ionizable salt ranges from 1-8 : 1, and
   wherein the eutectic mixture is one selected from the group consisting of a mixture of methylurea and NaSCN, a mixture of acetamide, urea and NaSCN, a mixture of methylcarbamate and NaSCN, and a mixture of N-benzylformamide and NaSCN.

14. An electrochromic device comprising:
   (a) a first electrode;
   (b) a second electrode;
   (c) an electrochromic material; and
   (d) the electrolyte of claim 1.

15. The electrochromic device according to claim 14, wherein the electrochromic material is contained in at least one of the first electrode, the second electrode and the electrolyte.

16. The electrochromic device according to claim 14, wherein the electrochromic material comprises: (a) an inorganic metal oxide selected from the group consisting of $WO_3$, $Ir(OH)_x$, $MoO_3$, $V_2O_5$, $TiO_2$, $NiO_x$, $LiNiO_x$ and $Li_2NiO_x$; (b) a conductive polymer selected from the group consisting of polypyrrole, polyaniline, polyazulene, polypyridine, polyindole, polycarbazole, polyazine and polythiophene; or (c) an organic electrochromic material selected from the group consisting of viologen, anthraquinone and phenocyazine.

17. The electrochromic device according to claim 14, wherein either or both of the first electrode and the second electrode comprises a transparent conductive film.

18. An electrolyte consisting of a eutectic mixture and a lithium salt, wherein the eutectic mixture is one selected from the group consisting of a mixture of methylurea and NaSCN, a mixture of acetamide, urea and NaSCN, a mixture of methylcarbamate and NaSCN, and a mixture of N-benzylformamide and NaSCN.

19. An electrolyte consisting of a eutectic mixture and a polymer or gel polymer impregnated with the eutectic mixture, wherein the eutectic mixture is one selected from the group consisting of a mixture of methylurea and NaSCN, a mixture of acetamide, urea and NaSCN, a mixture of methylcarbamate and NaSCN, and a mixture of N-benzylformamide and NaSCN.

20. An electrolyte comprising a eutectic mixture formed of an amide group-containing compound and a lithium-free ionizable salt,
   wherein the eutectic mixture is one selected from the group consisting of a mixture of methylurea and NaSCN, a mixture of acetamide, urea and NaSCN, a mixture of methylcarbamate and NaSCN, and a mixture of N-benzylformamide and NaSCN.

* * * * *